Patented July 10, 1945

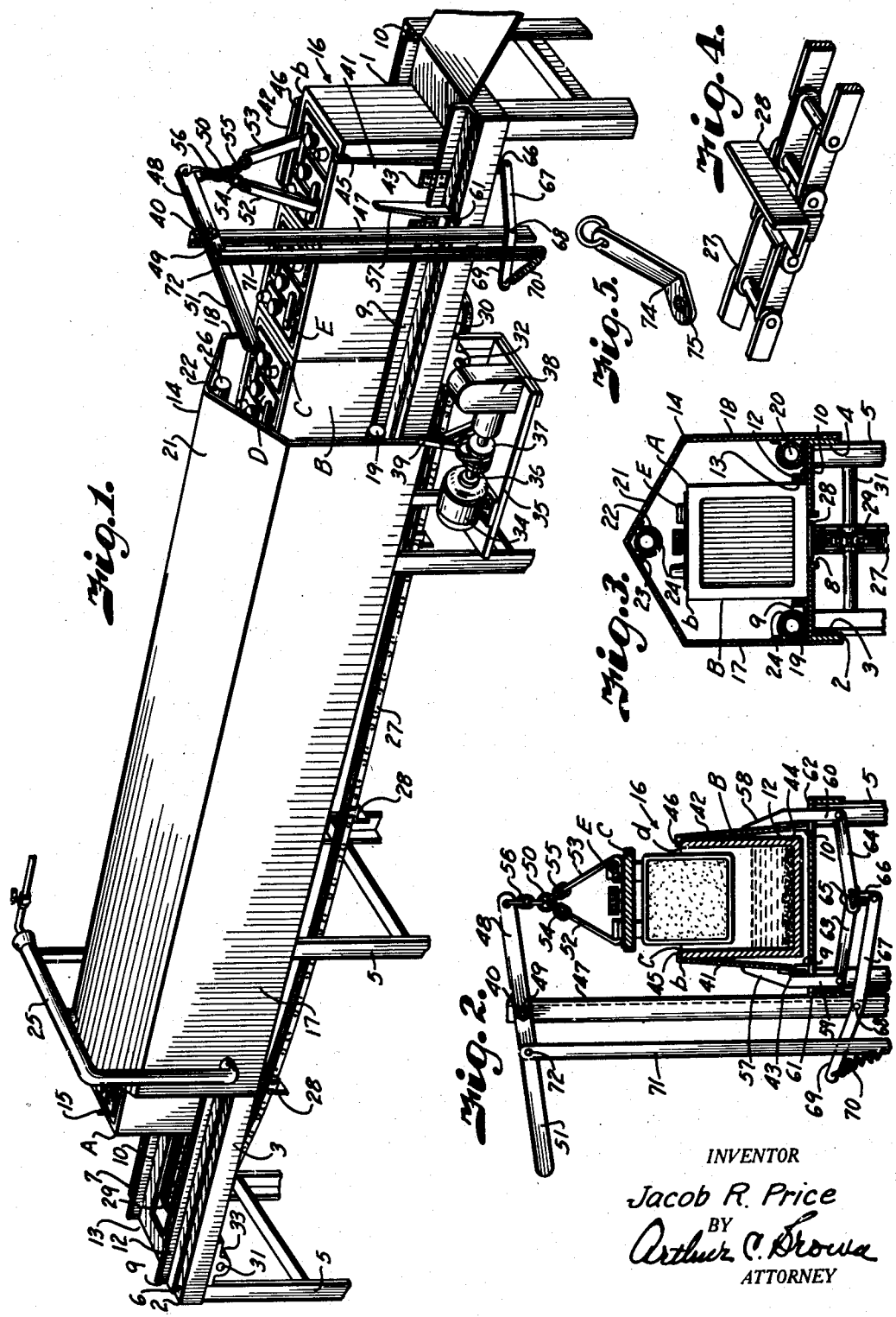

2,380,329

UNITED STATES PATENT OFFICE 2,380,329

BATTERY OPENING APPARATUS

Jacob R. Price, Kansas City, Mo.

Application February 1, 1943, Serial No. 474,383

6 Claims. (Cl. 136—174)

This invention relates to an apparatus for opening storage batteries and particularly old batteries from which it is desired to salvage the contained metal and metal compounds.

Old and worn out storage batteries are of little value except for the contained metal. Consequently when they are discarded they contain diluted sulphuric acid and are allowed to accumulate in scrap piles until sold to metal refiners, who purchase the batteries in large quantities for the metal and metal compounds they contain. Since the metal parts and compounds of batteries are sealed within the cases, it is necessary to "open" the batteries before they are available for refining. It has been the practice to break open the battery cases with an axe or the like, but such method is dangerous, because the acid may splash in the faces of the workmen and eat up their clothes. Such method also resulted in loss of the metal oxides because when the cases are split open, the diluted acid runs out on the ground or floor and carries with it a great amount of the lead oxide and the oxide cannot be recovered. To avoid such loss, it has been recent practice to pile the batteries about an open fire until the sealing compound and frozen fluids within the battery melt sufficiently to permit lifting the cells from the case. The heated batteries are then removed from the fire so that the cell connecting straps may be severed and the individual cells pried from the case one at a time. Men pulling the lead cells from the cases must stand in a stooped over position and in a few hours they become fatigued and suffer backache and cramps. This method conserves the oxides, but it consumes considerable time, is very inconvenient, and many of the batteries must be handled while excessively hot. perhaps ablaze and dripping hot sealing compound and steaming fluids. Other batteries which may have been further from the fire may not have been sufficiently heated to melt the sealing compound and thaw out ice and frozen fluids, consequently the plates remain so wedged within the cases that the cells are difficult to remove.

Other recent methods have been to use portable nozzles for directing jets of steam or a flame upon the sealing compound surrounding each individual cell until it became soft enough to permit removal of the cells, but even then the heat may be insufficient to thaw ice and frozen fluids within the batteries. The nozzle method also requires a steam boiler, hose, and hose connections to conduct the heating medium and the process also involves considerable time and produces hazards for the workmen.

All of the above difficulties limit the number of batteries that can be handled and have much bearing upon successful and profitable outcome of the business.

It is, therefore, the object of the present invention to provide a better and safer apparatus for opening batteries in shorter time and with considerably less effort on the part of the workman, because he may stand in erect position, there is no splashing of acid, and there is no loss of the lead oxide.

In accomplishing this and other objects of the invention, I have provided an improved apparatus illustrated in the accompanying drawing, wherein:

Fig. 1 is a perspective view of a battery opening apparatus constructed in accordance with the present invention.

Fig. 2 is an elevation of the plate lifting mechanism wherewith all the plates and metal parts are removed as a unit.

Fig. 3 is a cross-section through the heating tunnel showing the burner arrangement.

Fig. 4 is a perspective view of a portion of the conveyor which advances the batteries through the apparatus.

Fig. 5 is a detail view of a modified form of cell engaging member.

Referring more in detail to the drawing:

I designates a battery opening apparatus constructed in accordance with the present invention and which includes an elongated table-like frame 2 having longitudinal side rails 3 and 4 supported at a convenient height above the floor on legs 5. The rails 3 and 4 support plates 6 and 7 which are spaced apart to provide a slot-like opening 8 therebetween substantially coextensive with the length of the frame. Disposed on opposite sides of the opening are guide rails 9 and 10 having upwardly directed flanges 12 spaced apart to freely accommodate one dimension of a larger sized standard battery so as to form a battery guideway 13 therebetween.

Mounted upon the frame and extending over the guideway is a tunnel-like housing 14, having ends thereof spaced from the corresponding ends of the guideway to accommodate a battery receiving station 15 at one end and a plate pulling station 16 at the other. The tunnel includes side walls 17 and 18 spaced apart a greater distance than the width of the batteries to accommodate burners 19 and 20 therebetween. The side walls 17 and 18 are bridged by a roof 21 having the ridge thereof extending longitudinally and spaced above the batteries to accommodate a burner 22. The burners 19, 20 and 22 may comprise pipes arranged substantially coextensive with the housing 14 and supported therefrom by brackets 23. The burners have jet apertures 24 discharging in the direction of the batteries, that is the apertures in the pipes 19 and 20 are inclined upwardly and inwardly so that the flames play along the sides of the batteries while the apertures in the pipe 22 are directed downwardly to spread laterally over the battery tops as they are conducted through the housing. The forward ends of the burners are connected with a manifold 25 supplied with a fluid such as gas and the opposite ends of the burners are closed by caps 26.

While I have particularly described gas burners for use in the heating tunnel, it is obvious that any type of fuel may be used by substitution of the proper type burner. It is also obvious the electrical heaters or steam coils may be used within the heating tunnel. In fact, any form of heating means by which the heat may be evenly distributed and controlled is suitable.

The batteries are moved progressively along the guide by means of a conveyor, for example an endless chain 27, having battery engaging lugs 28 spaced therealong. The chain operates over sprockets 29 and 30 with the upper run thereof moving through the opening 8. The sprockets 29 and 30 are fixed on shafts 31 and 32 journalled in pairs of bearings 33 that are attached to the under side of the rails 3 and 4 at points below the station 15 and between the discharge end of the housing and station 16 respectively.

The conveyor is actuated by a motor 34 which is supported on a platform 35 suspended from the frame 2 below the rear end of the housing. The power shaft 36 of the motor is connected through a clutch 37 with a speed reduction gearing indicated by the housing 38, the power output connection of which is connected with the conveyor shaft 32. With this arrangement batteries may be progressively advanced from the station 15 and passed through the heating tunnel 14 to the pulling station 16 whenever the clutch 37 is actuated by a lever 39 having connection therewith.

Located at the pulling station is a battery plate puller mechanism 40 by which the loosened plates are withdrawn from the battery cases. The mechanism 40 includes a battery case holding means comprising plate-like holding members 41 and 42, hinged at 43 and 44 to the flanges 12 of the guide rails 9 and 10 so that the advanced batteries pass therebetween. The holding members are of sufficient height to permit flanges 45 and 46 on the upper edges thereof to project over the upper edges of the battery cases. Supported on the side of the table-like frame, adjacent the holding members, is a post 47 mounting a lever 48 on a pivot 49. One end of the lever projects over the path of the batteries and carries a tong 50, while the other end provides a handle 51 by which the lever is adapted to be rocked upon the pivot 49. The tongs include a pair of arms 52 and 53 having finger portions adapted to be engaged under the straps of the batteries, the arms being connected with the terminal ends of flexible branches 54 and 55 of a chain 56. Since batteries are of various widths and heights, I have provided means for moving the holding plates toward each other on their hinged connections so that the flanges will be in position to engage sides of the case regardless of varying widths of the batteries. Fixed to the holding plates are levers 57 and 58 having ends 59 and 60 projecting through slots 61 and 62 of the table-like frame and which are connected thereunder by links 63 and 64 having pin and slot connection 65 with a depending link 66. The link 66 is carried on the end of a lever 67 pivoted to the post as at 68, and which has a tail portion 69 connected by means of a spring 70 with the lower end of a bar 71, the upper end of which is pivotally connected, as at 72, with the handle end of the lever 48.

In using the apparatus constructed and assembled as described and assuming that the burners 19, 20 and 22 are in operation and that the motor is connected with a source of current supply, the first few batteries A to be opened are placed upon the station 15 so that they are in the position to be engaged by one of the conveyor lugs when the clutch 37 is engaged to drive the conveyor. The conveyor then pushes the batteries into the tunnel-like housing, clearing the station 15, whereupon the conveyor is stopped until the station 15 is again loaded and the clutch is re-engaged, causing the first of the batteries to be advanced through the tunnel-like housing and moving the second batteries into the housing. This process is repeated until the batteries emerge from the housing and the first reaches the pulling station 16. During travel of the batteries through the housing, the heat of the burner flame acts along the sides of the cases B and against the tops thereof to raise the internal temperatures sufficiently for thawing ice within the battery cells and causing the sealing compound C around the tops of the cells D to melt or at least to soften sufficiently to permit ready removal of the cells by the time the batteries reach the pulling station.

When the first of the batteries A reaches the pulling station, the operator thereof stops the conveyor with the battery between the plate-like hold-down members 41 and 42. The operator at the pulling station then drives the fingers 54 and 55 of the tongs under the cell connecting straps E of the battery. This is effected with little effort since the sealing compound is soft and readily displaced by the fingers of the tongs. The operator then swings the handle end 51 of the lever 48 downwardly. The first movement of the lever shifts the bar 71 downwardly, rocking the lever 67 by means of the spring connection 70. Movement of the lever 67 lifts the link 66 and causes the arms 57 and 58 to swing the plate-like holding members 41 and 42 inwardly which brings the flanges 45 and 46 thereof over the side edges b of the battery case B. Continued downward movement of the lever causes the spring 70 to stretch since further inward movement of the plate-like holding members 41 and 42 is stopped by the battery case, but the lever lifts the entire battery between the plate-like holding members until stopped by the flanges 45 and 46. Further movement of the lever lifts the cell parts from the battery case, as shown in Fig. 2, until the cell plates are carried slightly over the nearest side wall c of the battery case. The lever is then released to lower the removed unit onto the case with the bottom thereof resting upon the nearest side wall c of the case and the side of the unit resting upon the opposite side wall d. The tongs are then released, and the clutch is again engaged to cause the conveyor to push the opened battery from the pulling station and a succeeding battery into pulling position where the process is completed. As the batteries are cleared from the station 15, another operator places other batteries thereon, making the opening process substantially continuous.

The acid on the removed plates drains into the cases and the oxides therein are not disturbed (see Fig. 2). After the opened batteries are taken away from the machine the cells are lifted off the cases, after which the cases are emptied of acid and oxides so that the oxides may dry to permit recovery of all the lead.

It sometimes happens that the battery cell connecting straps are broken. In this case the posts of the cells are engaged by the gripping device 74 shown in Fig. 5. The device 74 consists of a plate adapted to be attached to the branches of the lifting chains and has an opening 75 to pass over the post when the portion of the plate having the opening is in horizontal position. Then when the lifting force is applied the plate moves into a bind to grip the post in the manner of a battery carrier.

It is obvious that the heat required is adjusted according to conditions of the weather merely by regulating the fuel supply, consequently the batteries are not over-heated and each is subjected to the heat necessary to facilitate opening thereof. The present machine permits of faster opening operations and increases the output of recovered metals at lower cost. It is also obvious that the machine makes the work easier and safer on the part of the operator.

What I claim and desire to secure by Letters Patent is:

1. A battery opening apparatus including, an elongated table-like supporting frame, guides at the sides of said frame, and spaced apart to provide a battery passageway therebetween, battery conveying means on the frame for moving a plurality of batteries in successive order along said passageway in upright position, a tunnel-like heating housing covering the passageway over the tops of the batteries, and having ends spaced from ends of the table-like supporting frame to provide a battery receiving station and a battery discharge station, and means for supplying heat within the housing to heat the batteries for melting solids tending to prevent removal of cells from the cases of the batteries.

2. A battery opening apparatus including, an elongated table-like supporting frame, guides at the sides of said frame, and spaced apart to provide a battery passageway therebetween, battery conveying means on the frame for moving a plurality of batteries in successive order along said passageway in upright position, a tunnel-like heating housing covering the passageway over the tops of the batteries, and having ends spaced from ends of the table-like supporting frame to provide a battery receiving station and a battery discharge station, a heater extending longitudinally within the top of the housing for directing heat onto the tops of the batteries moved along said passageway, and co-operating heaters located at the sides of said passageway at the bottoms of the batteries for directing heat on sides of the batteries while they are being moved along the passageway.

3. A battery opening apparatus including a tunnel-like housing having an inlet at one end and an outlet at the other end and having a length to contain a plurality of batteries in side to side relation, means for progressively moving the batteries in upright position through the tunnel-like housing from said inlet end and for discharging the batteries through said outlet end of the tunnel-like housing, means in the tunnel-like housing for heating the batteries and melting sealing compound retaining the cells of the batteries in the cases thereof, case holding means at the outlet end of the tunnel-like housing for holding the cases of the respective batteries as they are discharged from the outlet end of the housing, and plate lifting means cooperating with the case holding means for withdrawing the plates through the open tops of the cases.

4. A battery opening apparatus including a tunnel-like housing having an inlet at one end and an outlet at the other end and having a length to contain a plurality of batteries in side to side relation, means for progressively moving the batteries in upright position through the tunnel-like housing from said inlet end and for discharging the batteries through said outlet end of the tunnel-like housing, means in the tunnel-like housing for heating the batteries and melting sealing compound retaining the cells of the batteries in the cases thereof, case holding means at the outlet end of the housing, plate lifting means cooperating with the case holding means for withdrawing the plates through the open tops of the cases, and means for starting and stopping the battery moving means when a battery reaches the case holding means.

5. A battery opening apparatus including a tunnel-like housing having an inlet at one end and an outlet at the other end and having a length to contain a plurality of batteries in side to side relation, means for progressively moving the batteries in upright position through the tunnel-like housing from said inlet end and for discharging the batteries from said outlet end, a heater supported in the tunnel-like housing above the tops of the batteries for directing heat onto the batteries for melting sealing compound which seals the cells of the batteries in the cases thereof, case holding means at the outlet end of the housing, and plate lifting means cooperating with the case holding means for withdrawing the plates through open tops of the cases, and means for starting and stopping the battery moving means when a battery reaches the case holding means.

6. A battery opening apparatus including a tunnel-like housing having an inlet at one end and an outlet at the other end and having a length to contian a plurality of batteries in side to side relation, means for progressively moving the batteries in upright position through the tunnel-like housing from said inlet end and for discharging the batteries from said outlet end, a heater supported in the tunnel-like housing above the top of the batteries for directing heat onto the batteries for meling sealing compound which seals the cells of the batteries in the cases thereof, additional heating means in the tunnel-like housing and extending along the lower sides of the batteries for directing heat against the sides of the cases to melt any ice contained in the batteries, case holding means at the outlet end of the housing, cell lifting means cooperating with the case holding means for withdrawing the cells through the open tops of the cases, and means for starting and stopping the battery moving means when a battery reaches the case holding means.

JACOB R. PRICE.